July 7, 1936.  G. WEISS ET AL  2,046,859
AUTOMOBILE BUS
Filed May 27, 1935   2 Sheets-Sheet 1
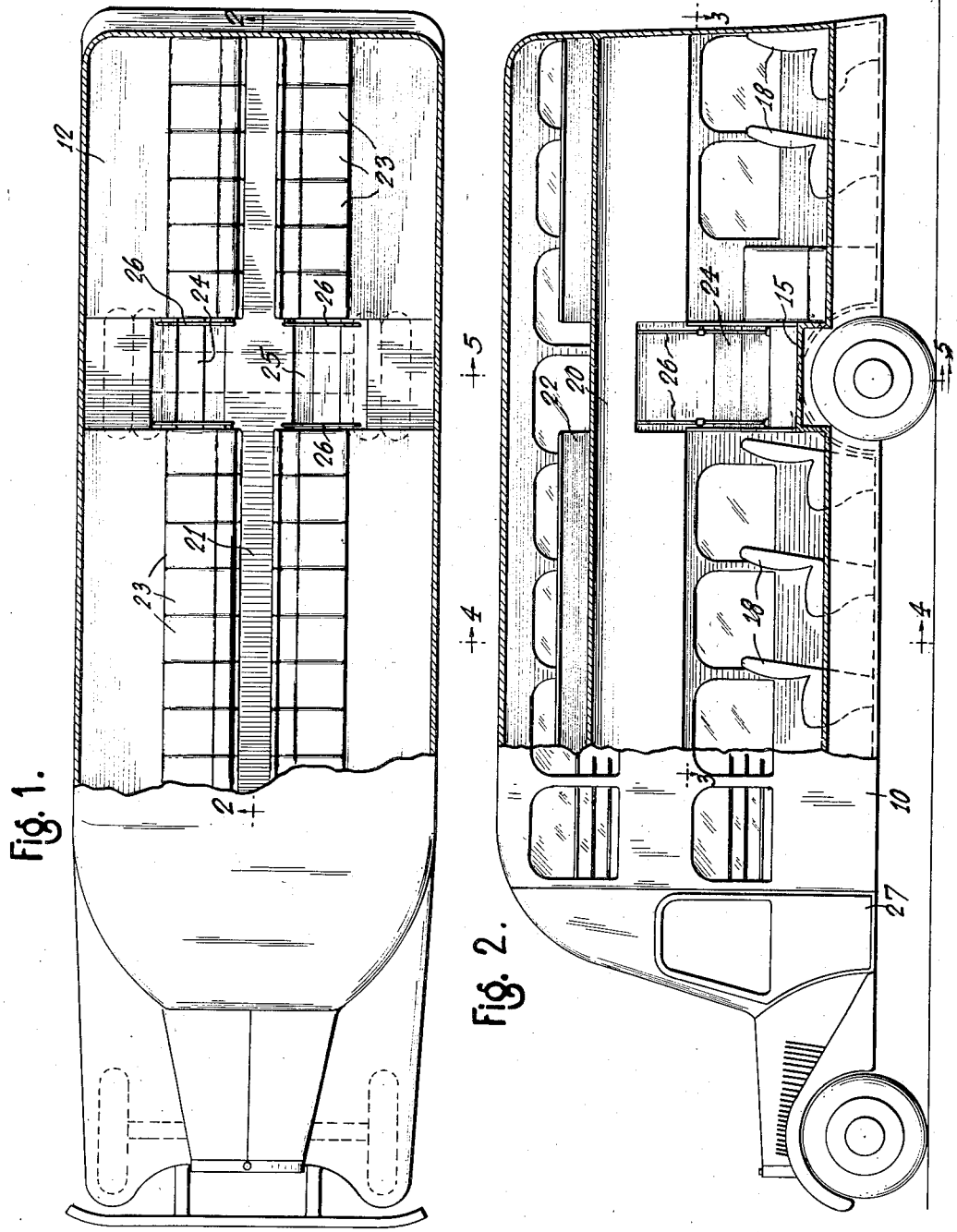
INVENTORS
G. WEISS
A. AVALLONE
BY F. Ledermann
ATTORNEY.

July 7, 1936.  G. WEISS ET AL  2,046,859
AUTOMOBILE BUS
Filed May 27, 1935   2 Sheets-Sheet 2
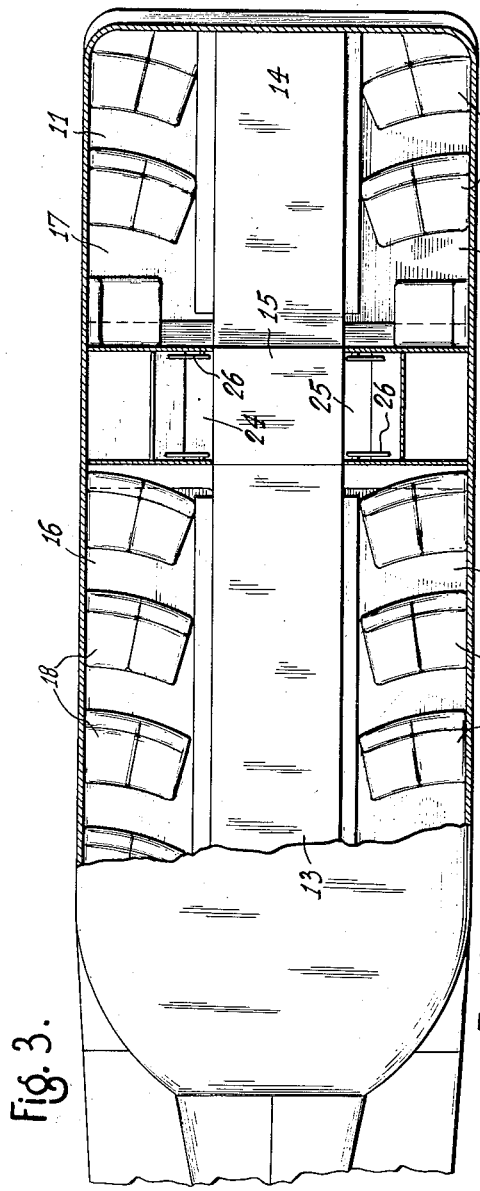
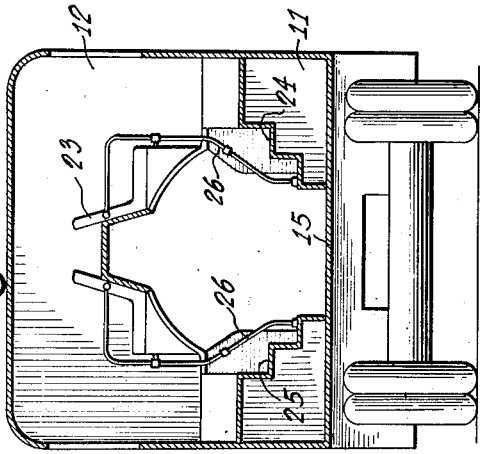
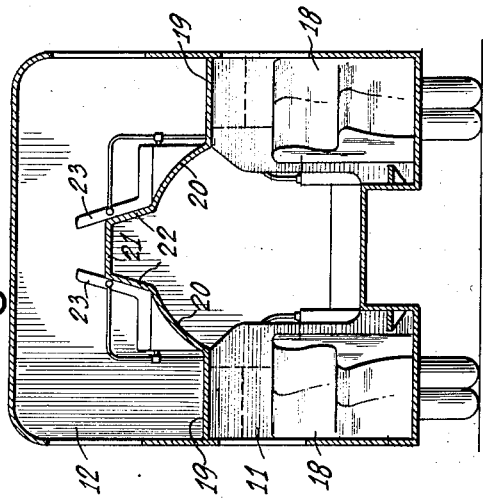
INVENTORS
G. WEISS.
A. AVALLONE
BY F. Lederman
ATTORNEY.

Patented July 7, 1936

2,046,859

UNITED STATES PATENT OFFICE 2,046,859

AUTOMOBILE BUS

George Weiss and Anthony Avallone,
New Rochelle, N. Y.

Application May 27, 1935, Serial No. 23,603

1 Claim. (Cl. 296—64)

One object of this invention is the provision of a novel improvement in the construction of automobile buses, whereby the number of passengers which can be accommodated in seats is greatly increased.

Another object of the invention is the provision of such a construction for buses which provides an upper deck or compartment in which additional passengers can be seated.

A further object is the provision of a novel means of passage from the lower compartment of the bus to the upper, and the entire construction is such as to utilize a maximum of available space for the provision of seats for passengers, the seats themselves being so designed and arranged as to aid in achieving the main object of the invention, which is, the seating of a relatively large number of passengers.

The above and other objects will become apparent in the description below, in which characters of reference refer to like-named parts in the accompanying drawings, in which Figure 1 is a plan view of the bus with parts broken away to expose the interior.

Figure 2 is a side elevational view of the bus with parts broken away to expose the interior, or a cross-sectional view taken on line 2—2 of Figure 1.

Figure 3 is a cross-sectional view taken on the line 3—3 of Figure 2.

Figure 4 is a cross-sectional view taken on line 4—4 of Figure 2.

Figure 5 is a cross-sectional view taken on line 5—5 of Figure 2.

Referring in detail to the drawings, the numeral 10 represents the body of an automobile bus having a lower compartment 11 and an upper compartment 12. The floor of the lower compartment 11 comprises an aisle in the center including a forward section 13, a rearward section 14, and an intermediate raised section 15 which extends over the rear axle of the chassis. The floor of the lower compartment further comprises the two forward side sections 16 and the two rearward side sections 17. Each of the side sections 16 and 17 is provided with seats arranged one behind the other. Each seat 18 is adapted to accommodate two passengers. These seats 18 may extend either at right angles to the side walls of the bus body, or they may be curved toward the outer walls as shown, to provide greater leg room for the passengers, as well as to utilize a greater width for the backs of the passengers.

The compartments 11 and 12 are divided from each other by a deck comprising side sections 19 and rounded central sections 20. A top panel 21 having two inclined side panels depending therefrom, is mounted on the rounded sections 20. The inclined panels 22 serve as supports for the backs of chairs or seats which are mounted side by side along each side of the upper deck.

Access between the compartments 11 and 12 is gained by means of two flights of stairs 24 and 25, one rising from each side of the lower floor section 15. Guard rails 26 are provided on these stairs, and other guard rails are provided as desired in various places. Access and egress to the bus is attained through one of the doors 27, although a door might be provided in the rear wall of the body if desired. An upper and a lower row of windows is provided in each side of the body.

From the above description it is apparent that the bus can seat two or more times the number of passengers of the common type of bus, and obviously modifications in form and structure may be made without departing from the spirit of the invention.

We claim:

An automobile bus comprising a body having an upper and a lower compartment, a floor in the lower compartment comprising a central longitudinal aisle having a raised section intermediate its length and side sections on either side of said aisle, seats arranged along each of said side sections, said seats being arcuately curved in plan view with the concave side of the arc facing forward, a dividing member between said compartments having a raised central section provided with inclined side panels, seats arranged side by side in the upper compartment on said raised central section of the dividing member with the backs of said seats lying against said side panels, and a stairway rising from each side of said aisle raised section to said upper compartment.

GEORGE WEISS.
ANTHONY AVALLONE.